US011225608B2

(12) United States Patent
Basin et al.

(10) Patent No.: US 11,225,608 B2
(45) Date of Patent: Jan. 18, 2022

(54) LIGNIN BASED FLAME RETARDANT COMPOSITIONS AND PROCESSES FOR THE PREPARATION THEREOF

(71) Applicant: DAREN LABORATORIES & SCIENTIFIC CONSULTANTS LTD., Nes Ziona (IL)

(72) Inventors: Pavel Basin, Petach Tikwa (IL); Elliot Silcoff, Tel Aviv (IL); Steve Daren, Nes Ziona (IL)

(73) Assignee: DAREN LABORATORIES & SCIENTIFIC CONSULTANTS LTD., Nes Ziona (IL)

( * ) Notice: Subject to any disclaimer, the term of this patent is extended or adjusted under 35 U.S.C. 154(b) by 0 days.

(21) Appl. No.: 16/632,614

(22) PCT Filed: Sep. 6, 2018

(86) PCT No.: PCT/IL2018/051008
§ 371 (c)(1),
(2) Date: Jan. 21, 2020

(87) PCT Pub. No.: WO2019/053713
PCT Pub. Date: Mar. 21, 2019

(65) Prior Publication Data
US 2020/0199455 A1 Jun. 25, 2020

Related U.S. Application Data

(60) Provisional application No. 62/592,446, filed on Nov. 30, 2017, provisional application No. 62/557,765, filed on Sep. 13, 2017.

(51) Int. Cl.
*C09K 21/14* (2006.01)
*C07G 1/00* (2011.01)
*C08J 3/21* (2006.01)
*C08L 63/00* (2006.01)
*C09K 21/04* (2006.01)

(52) U.S. Cl.
CPC ............ *C09K 21/14* (2013.01); *C07G 1/00* (2013.01); *C08J 3/212* (2013.01); *C08L 63/00* (2013.01); *C09K 21/04* (2013.01); *C08L 2201/02* (2013.01)

(58) Field of Classification Search
CPC . C09K 21/14; C09K 12/04; C07G 1/00; C08J 3/212; C08J 2397/02; C08L 63/00; C08L 2201/02; C08L 97/005
See application file for complete search history.

(56) References Cited

U.S. PATENT DOCUMENTS

| 4,857,638 A * | 8/1989 | Yalpani ............... C08H 6/00 530/505 |
| 5,945,467 A | 8/1999 | Iwata et al. |
| 6,491,850 B1 | 12/2002 | Blount |
| 7,129,291 B2 | 10/2006 | Blount |
| 8,268,121 B2 | 9/2012 | Blount |
| 8,409,403 B2 | 4/2013 | Blount |
| 8,986,437 B2 | 3/2015 | Blount |
| 2002/0158237 A1* | 10/2002 | Blount ............... G06Q 40/02 252/607 |
| 2004/0244448 A1 | 12/2004 | Blount |
| 2011/0098384 A1 | 4/2011 | Blount |
| 2012/0277349 A1 | 11/2012 | Hsieh et al. |
| 2014/0107257 A1 | 4/2014 | Blount |
| 2014/0378671 A1 | 12/2014 | Brizius |
| 2016/0145478 A1 | 5/2016 | Blount |

FOREIGN PATENT DOCUMENTS

| CN | 102250360 A | 11/2011 |
| CN | 102585141 A | 7/2012 |
| CN | 102757567 A | 10/2012 |
| CN | 103382281 A | 11/2013 |
| CN | 103910850 A | 7/2014 |
| CN | 104493932 A | 4/2015 |
| WO | 2006003421 A1 | 1/2006 |
| WO | 2012118165 A1 | 9/2012 |
| WO | 2018051345 A1 | 3/2018 |

OTHER PUBLICATIONS

Matsushita et al., (2017) A Biobased Flame-Retardant Resin Based on Lignin. Advanced Sustainable Systems 1(10): 1700073; 7 pages.
Prieur et al., (2016) Phosphorylation of lignin to flame retard acrylonitrile butadiene styrene (ABS). Polymer Degradation and Stability 127: 32-43 (12 pages).
International Search Report for PCT/IL2018/051008; dated Nov. 25, 2018 (3 pages).
Written Opinion of the International Searching Authority for PCT/IL2018/051008; dated Nov. 25, 2018 (5 pages).
International Preliminary Report on Patentability for PCT/IL2018/051008; dated Mar. 25, 2019 (14 pages).
BRIGIT Report Summary, Final Report Summary—BRIGIT (New tailor-made biopolymers produced from lignocellulosic sugars waste for highly demanding fire-resistant applications), European Commision, Project ID: 311935, Funded under: FP7-KBBE, Spain, Last updated on Nov. 15, 2016. European Commission Nov. 15, 2016 (Nov. 15, 2016) (6 pages).

(Continued)

*Primary Examiner* — Andrew J. Oyer
(74) *Attorney, Agent, or Firm* — Roach, Brown, McCarthy & Gruber, P.C.; Kevin D. McCarthy

(57) ABSTRACT

The present invention relates to environmentally friendly flame retardant materials based on renewable resources and industrial waste streams. The materials have advantageous intumescent properties, charring, gas phase radical traps and thermal stability. The present invention further relates to processes for the preparation of the flame retardant materials and to plastic materials comprising said flame retardant materials.

20 Claims, No Drawings

(56) References Cited

OTHER PUBLICATIONS

Alalykin et al., (2011) Preparation of modified hydrolysis lignin and its use for filling epoxy polymers and enhancing their flame resistance. Russian Journal of Applied Chemistry 84: Article No. 1616. Abstract—1 page.

Bykov and Ershov (2010) A sorbent based on phosphorylated lignin. Russian Journal of Applied Chemistry 83: 316-319. Abstract—1 page.

Cayla et al., (2016) PLA with Intumescent System Containing Lignin and Ammonium Polyphosphate for Flame Retardant Textile. Polymers (Basel) 8(9). pii: E331; 16 pages.

Costes et al., (2017) Bio-based flame retardants: When nature meets fire protection. Materials Science and Engineering: R: Reports 117: 1-25. Abstract—2 pages.

Efanov and Galochkin (2012) Phosphorylation of technical lignins. Chemistry of Natural Compounds 48: 457-459. Abstract—1page.

Fierro et al., (2005) Study of the decomposition of kraft lignin impregnated with orthophosphoric acid. Thermochimica Acta 433(1-2): 142-148. Abstract—1 page.

Illy et al., (2015) Phosphorylation of bio-based compounds: the state of the art. Polym Chem; Accepted Manuscript. 38 pages.

Li et al., (2001) The study of flame retardants on thermal degradation and charring process of manchurian ash lignin in the condensed phase. Polymer Degradation and Stability 72(3): 493-498. Abstract—1 page.

Liu et al., (2016) Fabrication of Green Lignin-based Flame Retardants for Enhancing the Thermal and Fire Retardancy Properties of Polypropylene/Wood Composites. ACS Sustainable Chem Eng 4(4): 2422-2431. Abstract—2 pages.

Nada et al., (2008) Characterization and properties of ion exchangers produced from lignin precipitated after peroxyacid pulping. BioResources 3(2): 538-548—11 pages.

Nikolaeva and Karki (2011) A Review of Fire Retardant Processes and Chemistry, with Discussion of the Case of Wood-plastic Composites. Baltic Forestry 17(2): 314-326—13 pages.

Phillips (1956) The Reactions of 8-Quinolinol. Chem Rev 56(2): 271-297. 1st page—2 pages.

Struszczyk (1986) Modification of Lignins. III. Reaction of Lignosulfonates with Chlorophosphazenes. Journal of Macromolecular Science: Part A—Chemistry 23(8): 973-992. Abstract—1 page.

Wroblewski et al., (1988) Phosphorus-31 NMR spectroscopic analysis of coal pyrolysis condensates and extracts for heteroatom functionalities possessing labile hydrogen. Energy Fuels 2(6): 765-774. Abstract—2 pages.

Yu et al., (2012) Functionalized lignin by grafting phosphorus-nitrogen improves the thermal stability and flame retardancy of polypropylene. Polymer Degradation and Stability 97(4): 541-546. Abstract—1 page.

Zhang et al., (2012) Modification of lignin and its application as char agent in intumescent flame-retardant poly(lactic acid). Polymer Engineering & Science 52(12): 2620-2626—7 pages.

Zhang et al., (2012) Preparation of lignin—silica hybrids and its application in intumescent flame-retardant poly(lactic acid) system. High Perform Polym 24(8): 9 pages.

DuPont™ Crastin® PBT; thermoplastic polyester resins. Molding Guide. Jul. 2004 (Jul. 2004); 32 pages.

DuPont™ Zytel® HTN; high performance polyamide. Molding Guide. Oct. 2001 (Oct. 2001); 20 pages.

Ultramid® (PA); Product Brochure. BASF SE. Aug. 2013; 68 pages.

* cited by examiner

LIGNIN BASED FLAME RETARDANT COMPOSITIONS AND PROCESSES FOR THE PREPARATION THEREOF

FIELD OF THE INVENTION

The present invention relates to environmentally friendly and chemically stable flame retardant materials based on renewable resources and industrial waste streams. The materials have advantageous intumescent properties, charring, gas phase radical traps and thermal stability. The present invention further relates to processes for the preparation of the flame retardant materials and to plastic materials comprising said flame retardant materials.

BACKGROUND OF THE INVENTION

In the field of industrial applications such as automotive, consumer electronics and home appliances, all plastic components must contain flame retardant (FR). Many of the well-known FR additives contain halogens (e.g. chlorinated and brominated substances), and therefore are potentially harmful to human health and to the environment.

Several alternative FR materials and halogen-free additives are known, such as the water releasing metal hydroxide additives. Metal hydroxides meet the environmental, health and cost requirements but the high concentration needed for an appropriate flame retardant effect restricts their use as an additive in many polymer types.

Phosphorus-containing FRs are of reduced ecological impact, and their range is wide and versatile due to the several potential oxidation states of phosphorus (P) atom. However, in some cases low molecular weight substances may be too mobile and leach out from the host polymeric matrix. Thus, a system containing such FRs should be well designed to prevent the migration of the phosphorous-based FR additive to the surface of the polymeric matrix.

The use and development of renewable resource derived materials has received increasing interest in recent years due to the raised awareness of environmentally friendly materials and processes. The use of renewable resources as FR green products such as lignin and chemically modified lignin was found to be beneficial. Lignin is one of the most abundant organic substances on earth and is increasingly available as a by-product of cellulose production, which is mainly geared towards the paper industry. Lignin-containing materials demonstrate the ability to prevent a material from dripping, forming a solid char upon exposure to high temperatures and remain adhered to the exposed surface.

A physical barrier forming effect as described hereinabove is a known property of intumescent substances or systems comprising these substances. In such materials, exposure to heat causes the material to release gases that lead to an increase in volume as a foamed material and a decrease in its density. The swollen phase constitutes a barrier interface between the material itself and the heat source, oxygen and other fire-enhancing gases, and slows the flame's progress.

Costes et al. summarize uses, preparations and compositions of bio-based flame retardants, including lignin based flame retardants.

CN 103382281 discloses epoxy-lignin based FR laminates. CN 102250360 discloses solvent lignin-cyanamide derivative FR and a method for its preparation. CN 102585141 discloses FR material based on polyurethane foam in combination with lignin and a preparation method thereof. CN 102757567 discloses nitrogen-based lignin FR agent and corresponding FR composite materials containing such agent.

U.S. Pat. No. 7,129,291 discloses urea-bio bawd urethane FR compositions. WO 2006/003421 discloses flexible FR nanocomposite based on polyurethane foams and clay. US Patent Application US 20020158237 discloses FR based on amino-aldehyde-phosphate resins and copolymers, and their preparation methods. CN 104493932 discloses aqueous solutions of the products of the reactions between lignosulfonate (LS), melamine and formaldehyde as protective coatings to prevent fire in wooden buildings of historic value.

There remains an unmet need for, and it would be advantageous to have a halogen-free, solid intumescent FR system, which can be used as an additive to plastics, thereby enhancing their flame retardation properties at high temperatures, and can be manufactured in a facile and straightforward process. Advantageously, FR products may be generated from waste stream biomass to be beneficial both in terms of consumption of the waste as a raw material as well as generation of environmentally friendly FR products.

SUMMARY OF THE INVENTION

The present invention provides a flame retardant (FR) materials and a facile, economically advantageous and environmentally friendly method for the preparation thereof. The composite material comprises a flame retardant based on renewable resources, namely, a lignin-based composition, a carbonyl source(s) an amine(s) and a phosphorus oxide compound(s). All the components are chemically coupled together by covalent and/or ionic bonds to give a synergistic intumescent material. The FR material is solid at room temperature and is characterized by low water solubility, a desired property in terms of environmental safety regulations and use in typical flame retardant applications. The material is further characterized by having a low water content. Furthermore, the material's distinct formulation gives rise to a chemically stable FR material, exhibiting high temperature resistivity.

Furthermore, the FR material of the invention can be incorporated into commonly used plastic materials as an additive, and improve their FR properties, without jeopardizing their mechanical properties.

Advantageously, the use of waste products as a resource to produce the FR compositions can also serve as eco-friendly utilization of waste stream biomass. As a further benefit the generation of the FR compositions from waste stream biomass may concomitantly allow for the purging or scrubbing of damaging components such as sulfur present in the biomass. As yet a further benefit the reaction mixture used in the generation of these FR compositions does not require the addition of a free aldehyde such as formaldehyde but relies on the generation of aldehydes by exposure of the mixture to the phosphorous pentoxide.

In some embodiments the present invention provides a flame retardant (FR) material comprising the reaction products formed by reacting a) a lignin-based composition, at least one carbonyl source selected from a carbonyl, a carbonyl precursor or both, and at least one amine and b) phosphorus pentoxide, wherein said material is solid at 25° C.

In some embodiments the material is a chemical reaction product of a) 12-50% of a lignin-based composition, 1-20% of at least one carbonyl source selected from a carbonyl, a carbonyl precursor or both, and 10-35% of at least one amine and b) 25-55% of phosphorus pentoxide.

In some embodiments the lignin-based composition is selected from Spent Sulfite Liquor (SSL), Black Liquor (BL), coffee waste, olive pomace, straw, grass, tea leaves, nut shells, dietary fiber, fruit pits and a combination thereof.

In some embodiments the lignin-based composition is selected from Spent Sulfite Liquor (SSL), Black Liquor (BL) and a combination thereof.

In some embodiments the lignin-based composition is SSL.

In some embodiments the amine is selected from the group consisting of melamine, ethylene diamine; guanidine carbonate, piperazine, an amino acid, a polypeptide, a nucleic acid and combinations thereof.

In some embodiments, the at least one carbonyl source is selected from an aldehyde, an aldehyde precursor or both.

In some embodiments, the at least one aldehyde source comprises at least one polyhydroxyl compound.

In some embodiments the at least one polyhydroxyl compound comprises at least one sugar, wherein the sugar is present in said lignin-based composition.

In some embodiments both the amine and the carbonyl are provided from fish industry waste streams such as fish innards or fish meal.

In some embodiments both the amine and the carbonyl are provided from meat and poultry industry waste streams containing gelatin or keratin.

In some embodiments the FR material comprises 10 to 25% carbon, 5 to 20% nitrogen, 40 to 50% oxygen, 12 to 30% phosphorus and not more than 4% sulfur w/w.

In some embodiments the FR material comprises not more than 5% water w/w.

In some embodiments there is provided a plastic material comprising the FR material of the present invention and a polymeric material.

In some embodiments the polymeric material is selected from the group consisting of polyhydroxyalkanoate (PHA), polyethylene glycol (PEG), polyester, polyamide, polylactic acid (PLA), polybutylene succinate (PBS), poly p-phenylene (PPP), polytrimethylene tetraphthalate (PTT), polyethylene (PE), polypropylene (PP), polystyrene (PS), polycarbonate, epoxy resin, polyurethane (PU) and combinations thereof.

In some embodiments the present invention provides a method for the preparation of the FR material disclosed herein. The method comprises the steps of:
 (i) mixing the lignin-based composition, the aldehyde source and the amine;
 (ii) adding the phosphorus pentoxide to the mixture of step (i); and
 (iii) drying the product obtained in step (ii) to obtain a solid, water-insoluble FR material.

In some embodiments step (ii) further comprises adding phosphoric acid to the mixture of step (i).

In some embodiments step (ii) comprises adding said phosphorous pentoxide in at least two portions.

In some embodiments adding the phosphorous pentoxide results in an exothermic reaction, and step (ii) is devoid of external heating.

In some embodiments the exothermic reaction results in heating the mixture of step (ii) to a temperature in the range of 100° C. to 200° C.

In some embodiments, the drying of step (iii) is achieved spontaneously by the temperature of said exothermic reaction.

In some embodiments the method further comprises step (iv) of grinding the FR material to a powder.

In some embodiments the mixture of step (i) comprises a first amount of water, and wherein the following the drying in step (iii), the material comprises less than 15% of said first amount.

In some embodiments step (iii) further comprises cooling the product obtained in step (ii).

In some embodiments the exothermic reaction releases sulfur containing gases that are scrubbed.

Further embodiments, features, advantages and the full scope of applicability of the present invention will become apparent from the detailed description given hereinafter. However, it should be understood that the detailed description, while indicating preferred embodiments, of the invention, are given by way of illustration only, since various changes and modifications within the spirit and scope of the invention will become apparent to those skilled in the art from this detailed description.

DETAILED DESCRIPTION OF THE INVENTION

The present disclosure is directed to a flame retardant material, which is based on renewable resources. The flame retardant material is generally based on industrial waste streams, which include lignin derivatives, thereby promoting the use of the discarded waste. The FR material disclosed herein comprises a combination of the lignin-based composition together with a carbonyl source, an amine and at least one phosphorus oxide compound. This combination gives rise to enhanced intumescent properties of the resultant material. The FR material of the invention is generally, substantially devoid of water, and a solid poorly water-soluble material at room temperature.

Utilizing a naturally-based eco-friendly polymer such as lignin-based material promotes the use of renewable resources for versatile industrial applications, and allows beneficial FR properties originating from environmentally-safe materials. The FR material of the invention demonstrates synergistic FR characteristics and mechanical properties.

In some embodiments there is provided a flame retardant (FR) material comprising a lignin-based composition, at least one carbonyl source selected from a carbonyl, a carbonyl precursor or both, at least one amine and at least one phosphorus oxide compound, wherein said material is solid at 25° C.

In some embodiments, the FR material as described above is consisting of a lignin-based composition, at least one carbonyl source, at least one amine and at least one phosphorus oxide compound.

In some embodiments the FR material is prepared from a lignin-based composition, at least one carbonyl source selected from a carbonyl, a carbonyl precursor or both, at least one amine and at least one phosphorus oxide compound.

In some embodiments there is provided a flame retardant (FR) material comprising the reaction products formed by the chemical reaction between a) lignin-based composition, at least one carbonyl source selected from a carbonyl, a carbonyl precursor or both, and at least one amine; and b) phosphorus pentoxide, wherein said material is solid at 25° C.

As used herein the term "flame retardant" (FR) refers to a material which reduces the impact of fires. A flame retardant material is often added to or used in a coating treatment of flammable materials such as fabrics and plastics to prevent, delay, or limit the spread of fire and minimize fire damage.

In some embodiments the FR material is an FR composite material. The term "composite material" generally designates a material formed by at least two constituent materials. Composite material generally exhibit different physical or chemical properties compared to the separate constituting materials. After being formed, the composite material may not be separated into the constituting materials. Hence the constituting materials undergo a chemical reaction to form a new entity.

In some embodiments the material is the chemical reaction product of the lignin-based composition, the at least one carbonyl source, the at least one amine and the phosphorus pentoxide.

The term "coupled" and "coupling" as used herein are interchangeable with the term "combined" and "combining" respectively. "Combining" as used herein refers to mixing at least two separate components. The combination may lead to the formation of a mixture, in which the identities of the separate components are retained, or it may lead to a formation of a new chemical entity, e.g. by formation of a new chemical, via covalent or ionic bonds. In some embodiments, the combination entails formation of chemical bonds. In some embodiments, the chemical bonds are covalent or ionic chemical bonds. In cases where a combination or coupling leads to a chemical reaction to form new chemical entity, the chemical reaction may be spontaneous, induced by an external energy source and/or induced by a catalyst, which reduces the enthalpy of reaction. In some embodiments, the combination leads to a spontaneous reaction.

It was found that combining the starting materials disclosed above results in a chemical reaction, forming a chemical entity, which is a chemical reaction product of lignin, carbonyl compound, amine and phosphorus pentoxide. The chemical reaction product has distinctive chemical and physical properties, compared to the properties of the starting materials. Specifically, it has improved flame retardant properties. The term "chemical reaction product", as used herein refers to a compound or a plurality of compounds, which is formed by a chemical reaction and includes atoms and/or chemical fragments derived from the starting components, which lead to its formation. For example, a chemical reaction product of lignin, carbonyl compound, amine and phosphorus oxide may include a mixture of compounds, which include atoms (e.g. C, H, O, N and P) and fragments, derived from the lignin, carbonyl, amine and phosphorus pentoxide components. The reaction product molecules may include covalent and/or ionic chemical bonds between the different fragments. The chemical reactions leading to the chemical reaction product may be, for example, a condensation(s), leading to a condensate(s), and/or addition (s), leading to an adduct(s).

Without wishing to be bound by any theory or mechanism of action, lignins include phenolic rings, which are considered to be active towards electrophilic substitutions. Specifically, the ortho position of activated phenol ring are prone to undergo electrophilic aromatic reactions, such as, but not limited to, the Betti reaction (Phillips, J. P. *Chem. Rev.* 1956, 56, 286), which involves an aldehyde, an amine and a phenol, leading to an ortho-aminomethyl phenolic product. Carboxylic acids and their derivatives, such as acyl halides and anhydrides may also react via a Friedel Crafts mechanism at the ortho position of the phenol ring forming a ketone. This ketone can then form a Schiff base through a reaction with an amine. Other reactions, which may occur when using the components described above include a formation of a P—O bond between the lignin phenolic ring oxygen atom and the phosphorus oxide phosphorus atom; and acid-base reaction between the amine and the phosphorus oxide; and a formation of a carbonyl from a carbonyl precursor, such as a polyol, as described below.

Further, NMR evidence shows that many of the aromatic methoxy groups of the lignosulfonate are removed as methanol during the reaction and are replaced by aromatic phosphate esters. The formation of an aromatic phosphate ester, improves the flame retardant properties, due to its high phosphorus and oxygen content. In some embodiments the formation of an aromatic phosphate ester, further improves the flame retardant properties, due to its high phosphorus content.

In some embodiments a fragment of the amine is covalently bound to a fragment of the carbonyl source. In some embodiments a fragment of the lignin is covalently bound to a fragment of the carbonyl source. In some embodiments a fragment of the lignin is covalently bound to a fragment of the phosphorus oxide compound.

The term "fragment" of a base molecule refers to any partial group of atoms in the molecule. For a molecule having n atoms, the term includes any number of atoms derived from the base molecule, between 1 and n−1. For example, a fragment of an amine, $RNH_2$, may be, but is not limited to, RNH—, RN—, R— etc., where R may denote a carbon based fragment, such as an alkyl or an aryl. A fragment of a carbonyl, RCOX, may similarly be, but is not limited to, RCO—, R—, O—, etc., where X may denote any substituent, such as H, C, OR, OH. A fragment of an aldehyde, RCHO, may similarly be, but is not limited to, RCO—, RCH—, R—, O— etc. A fragment of phosphoric acid, $P(O)(OH)_3$, may similarly be, but not limited to, $P(O)(OH)_2O$—, —OP(O)(OH)O— etc.

Generally, the flame retardant material disclosed herein comprises at least four components, i.e. a lignin-based composition, at least one aldehyde source, at least one amine and at least one phosphorus oxide compound. However, some compounds include more than a single functionality and may function as more than one component. For example, some lignin-based compositions include, other than lignin, also carbonyl compounds, such as aldehydes and/or carbonyl precursors, such as sugars. Another non-limiting example includes compounds, which include both an amine moiety and a carbonyl, such as amino acids. These, as well as other poly-functional materials may be used for more than one function, thereby be used as more than one component. In some embodiments the flame retardant material comprises at least two components. In some embodiments the flame retardant material comprises at least three components. In some embodiments the flame retardant material comprises at least four components. In some embodiments the flame retardant material comprises four components.

The FR materials and method disclosed herein utilize economically favored and abundant starting material, namely, lignin-based material, which is available as a by-product of cellulose production. In some embodiments the lignin-based composition comprises lignosulfonate (LS). In some embodiments the lignin-based composition are technical lignins. In some embodiments the lignin-based composition comprises Spent Sulfite Liquor (SSL), Black Liquor (BL), coffee waste, olive pomace, straw, grass, tea leaves, nut shells, dietary fiber, fruit pit or a combination thereof. In some embodiments the lignin-based composition is selected from Spent Sulfite Liquor (SSL), Black Liquor (BL), coffee waste, olive pomace, straw, grass, tea leaves, nut shells, dietary fiber, fruit pit and a combination thereof. In some embodiments the lignin-based composition is selected from Spent Sulfite Liquor (SSL), Black Liquor (BL) and a combination thereof. In some embodiments the lignin-based composition is SSL. In some embodiments the lignin-based composition is BL. In some embodiments the lignin-based composition comprises SSL. In some embodiments the lignin-based composition comprises BL.

Two widespread processes for cellulose production are the Kraft process and sulfite processes. In accordance with the sulfite processes, wood chips or other lignocellulose are cooked under pressure in sulfite liquor so that lignins of the lignocellulose are solubilized and thereby separable from the insoluble cellulose, in a process generally known as pulping. The cellulose is then separated from the liquor, the liquor resulting from the separation is known as spent sulfite liquor (SSL). Such liquors include lignosulfonates and wood sugars (e.g. xylose, mannose, galactose, glucose). Typically SSL is composed of 55% total solids (about 35% lignosulfonates and 20% sugars w/w). In some embodiments the lignin-based composition comprises 10% to 60% lignosulfonates. In some embodiments the lignin-based composition comprises 20% to 50% lignosulfonates. In some embodiments the lignin-based composition comprises 25% to 45% lignosulfonates. In some embodiments the lignin-based composition comprises 30% to 40% lignosulfonates.

The Kraft process is another process for conversion of wood into wood pulp. It entails treatment of wood chips with a hot mixture of water, sodium hydroxide, and sodium sulfide that breaks the bonds that link lignin, hemicellulose, and cellulose. In the process the wood chips are cooked in pressurized vessels. The solid pulp (about 50% by weight of the dry wood chips) is then collected and washed. At this point the pulp is known as brown stock because of its color. The separated combined liquids are waste known as black liquor (BL). They contain lignin fragments, carbohydrates from the breakdown of hemicellulose, sodium carbonate, sodium sulfate and other inorganic salts. Typically, the composition of BL concentrate (i.e. after water evaporation and skimming tall oil) is composed of 65%-85% total solids.

One of the advantages of the flame retardant and process disclosed herein is that crude natural lignin sources, such as BL and SSL may be used as is, without the necessity of extracting or purifying the lignin molecules from the bulk mixture. In addition, it was surprisingly found that different types of waste, such as coffee waste, olive pomace (the olive material remaining after extraction of olive oil), straw, grass, tea leaves, nut shells, dietary fiber, fruit pits may be used as a source of lignin.

Without wishing to be bound by any theory or mechanism of action, and as described above, the phosphorus oxide compound(s) of the present composition may be involved in reaction, which form the FR composition. Such reactions include formations of P—O bonds between the lignin phenolic ring oxygen and the phosphorus oxide phosphorus atom; acid-base reactions between the amine and phosphoric acid, and a transformation of a carbonyl precursor, such as a polyol, into a carbonyl. Generally, the phosphorus oxide compound, which may be preferable for achieving these tasks include phosphorus oxide dehydrating agents, such as phosphorus pentoxide and/or phosphoric acid. In some embodiments at least one phosphorus oxide compound in the FR material is a phosphorus oxide dehydrating agent. In some embodiments at least one phosphorus oxide compound in the FR material is selected from phosphorus pentoxide, phosphoric acid and combinations thereof. In some embodiments at least one phosphorus oxide compound in the FR material is phosphorus pentoxide. In some embodiments at least one phosphorus oxide compound in the FR material is substantially devoid of phosphoric acid. In some embodiments, the FR material is substantially devoid of phosphoric acid.

As used herein, the term "phosphorus oxide" refers to any compound, which includes an oxygen atom covalently bound to a phosphorus atom. Preferably, the phosphorus atom of the phosphorus oxide compound described herein is chemically bound to more than a single oxygen atom, such that the term includes P(V) compounds, such as phosphorous pentoxide, phosphoric acid and it salts.

As used herein, the term "phosphorus oxide dehydrating agent" refers to a phosphorus oxide compound that removes molecular water, or hydrogen and oxygen in a ratio so as to form $H_2O$, from a chemical compound, reaction mixture, or solution. Typically the hydrogen and oxygen atoms acquired from the dehydrated molecule react with the dehydrating agent to either form a new compound or to form a hydrate. Suitable phosphorus oxide dehydrating agents include, for example, phosphorous pentoxide and phosphoric acid.

The term "phosphorus pentoxide" as used herein refers to any compound consisting of 2n phosphorus atoms and 5n oxygen atoms, where n is a positive integer. The term includes any isomer of phosphorus pentoxide, including $P_2O_5$ and $P_4O_{10}$. Phosphorus pentoxide is considered to be a powerful desiccant and dehydrating agent. In some embodiments, the phosphorus pentoxide has an empiric formula of $P_2O_5$. In some embodiments, the phosphorus pentoxide has a molecular formula selected from $P_2O_5$ and $P_4O_{10}$. In some embodiments, the phosphorus pentoxide has a molecular formula of $P_4O_{10}$. In some embodiments, the phosphorus pentoxide has a molecular formula of $P_2O_5$.

In some embodiments at least one phosphorus oxide compound in the FR material is phosphorus pentoxide. In some embodiments the at least one phosphorus oxide compound comprises phosphorus pentoxide.

Generally, phosphorus pentoxide is preferred since it is both inexpensive, and invokes a spontaneous dehydration exothermic reaction when mixed with the other components of the composition raising the temperature dramatically. Specifically, it is contemplated that since phosphorus pentoxide is a powerful dehydrating agent, while other components (i.e. the lignin-based composition, which may include water, and the carbonyl source) are prone to dehydration, mixing these components promotes an exothermic reaction, which vaporizes the water out of the mixture and facilitates the reaction progression, as described below with relation to the method for the preparation of FR materials. In addition to sparing a step(s) of external heating, the exothermic reaction heating and vaporization of water both result in a kinetically desirable concentration of the reaction mixture; and they are beneficial for producing a substantially water-free FR material, as described below. Moreover, from analyses of the compositions described herein it was surprisingly found that upon reaction lignin sulfonate derived from SSL with phosphorus pentoxide, —$SO_3M$ (M=metal, typically, sodium) groups in the lignin are removed through a desulfurization process, and are substituted by phosphate ester groups, while the sulfur is released as sulfur dioxide. Another advantage of phosphorus pentoxides, which stems from its strong dehydration ability is the dehydration rapid reaction, which transforms alcohols and/or polyhydroxyl compounds (collectively referred herein as "carbonyl precursors" and/or "aldehyde precursors"), such as vicinal diols/polyols, which are present in cellulose waste compositions, into carbonyls.

In some embodiments the FR material comprises a plurality of phosphorus oxide compounds. In some embodiments the FR material comprises a single phosphorus oxide compound. In some embodiments the FR material comprises two phosphorus oxide compounds. In some embodiments the FR material comprises three phosphorus oxide compounds.

In some embodiments the FR material comprises at least one phosphorus oxide compound selected form phosphorus pentoxide, phosphoric acid and both, and an additional phosphorus oxide compound, selected from phosphoric acid, hydroxyapatite, struvite, phosphorite and a combination thereof. In some embodiments the FR material comprises phosphorus pentoxide and an additional phosphorus oxide compound, selected from hydroxyapatite, struvite, phosphorite and a combination thereof. In some embodiments the FR material comprises phosphorus pentoxide, phosphoric acid and an additional phosphorus oxide compound, selected form hydroxyapatite, struvite, phosphorite and a combination thereof. In some embodiments the additional phosphorus oxide compound, is hydroxyapatite $(CasPO_4)_3OH$. In some embodiments the additional phosphorus oxide compound, is struvite ($MgNH_4PO_4$). In some embodiments the additional phosphorus oxide compound, is phosphorite.

In some embodiments the amine is selected from the group consisting of melamine, ethylene diamine; guanidine carbonate, piperazine, an amino acid, a polypeptide, a nucleic acid and combinations thereof. Each option represents a separate embodiment.

It is to be understood the certain compounds, such as amino acids contain both a carbonyl moiety and an amine moiety. This allows such compounds to function both as the amine and as the carbonyl compound of the present FR material.

In some embodiments the amine is selected from the group consisting of ammonia, an alkyl amine, a diamine, a triamine, a polyamine, an alkanolamine, a cyclic amine, an amine heterocycle and an amino acid. In some embodiments the diamine is ethylene diamine. In some embodiments the triamine is melamine. In some embodiments the amine is melamine.

In some embodiments the amine is guanidine carbonate. In some embodiments the amine is piperazine. In some embodiments the polypeptide is selected from the group consisting of gelatin, keratin, casein, a nucleoprotein and any combination thereof. In some embodiments the nucleic acid is selected from the group consisting of DNA, RNA and a combination thereof. In some embodiments the amine contains at least 10% nitrogen by mass. In some embodiments the amine contains at least 20% nitrogen by mass. In some embodiments the amine contains at least 30% nitrogen by mass. In some embodiments the amine contains at least 40% nitrogen by mass. In some embodiments the source of the amines is fish wastes.

The terms "carbonyl" and "carbonyl compound" as used herein are interchangeable and refer to chemical compounds, preferably organic compounds, which possess the carbonyl moiety. Carbonyl compounds include, but are not limited to, aldehydes, ketones, carboxylic acids and carboxylic acid derivatives, such as esters, acyl halides, acid anhydrides, amides, imides, acyl cyanides, acyl azides, etc. The term "carbonyl moiety" refers to the C=O moiety, in which a carbon atom is covalently bound to an oxygen atom by a double bond. Typically, in carbonyl compounds, the carbon atom is further bound to two more substituent groups.

In some embodiments the carbonyl is selected from the group consisting of an aldehyde, a ketone, a carboxylic acid, an acyl halide and an acid anhydride. Each possibility represents a separate embodiment.

In some embodiments the carbonyl is an aldehyde. In some embodiments the carbonyl precursor is an aldehyde precursor. In some embodiments the carbonyl source is an aldehyde source. In some embodiments the flame retardant material comprises at least one aldehyde source selected from an aldehyde, an aldehyde precursor or both.

In some embodiments the carbonyl source is selected from the group consisting of formaldehyde, a polyhydroxyl compound, a sugar and a combination thereof. Each possibility represents a separate embodiment. In some embodiments the aldehyde source is selected from the group consisting of formaldehyde, a polyhydroxyl compound, a sugar and a combination thereof. Each possibility represents a separate embodiment. In some embodiments the carbonyl source is gelatin and keratin wastes.

As mentioned above, a carbonyl compound, preferably, an aldehyde may be required for forming covalent bonds with the lignin and the amine components. The aldehyde is derived from at least one aldehyde source, which may include an aldehyde and/or an aldehyde precursor. Aldehyde precursors may include compounds, such as polyhydroxyl compounds, which form aldehydes upon dehydration. Specifically, waste streams from the paper industry, such as BL (black liquor) and SSL (spent sulfite liquor) include, in addition to lignins, sugar molecules. These sugars, which are polyhydroxyl compounds, undergo dehydration in the presence of dehydrating agents, such as phosphorus pentoxide, to form aldehydes, in situ. For example, glucose dehydration results in 5-hydroxymethylfurfural, which is an aldehyde. Similarly, the dehydration of xylose results in the aldehyde furfural.

The terms "polyhydroxyl" and "polyhydroxyl compound" as used herein are interchangeable and refer to a compound, which includes a plurality of hydroxyl (—OH) functional groups. The terms include, but are not limited to, polyols, sugars, diols, triols, sugar alcohols, such as erythritol, and the like. In some embodiments the polyhydroxyl compounds include a vicinal diol moiety. The term "vicinal diol moiety" refers to two hydroxyl groups residing on adjacent carbon atoms.

The term "plurality" refers to at least two. For example, the expression 'plurality of hydroxyl functional groups' refers to at least two hydroxyl functional groups in a compound.

In some embodiments the carbonyl source comprises a carbonyl precursor. In some embodiments the carbonyl source comprises a carbonyl. In some embodiments the carbonyl source comprises a carbonyl precursor and a carbonyl. In some embodiments the carbonyl source comprises at least one carbonyl precursor. In some embodiments the carbonyl source comprises at least one carbonyl. In some embodiments the carbonyl source comprises at least one carbonyl precursor and at least one carbonyl.

In some embodiments the aldehyde source comprises an aldehyde precursor. In some embodiments the aldehyde source comprises an aldehyde. In some embodiments the aldehyde source comprises an aldehyde precursor and an aldehyde. In some embodiments the aldehyde source comprises at least one aldehyde precursor. In some embodiments the aldehyde source comprises at least one aldehyde. In some embodiments the aldehyde source comprises at least one aldehyde precursor and at least one aldehyde.

In some embodiments the carbonyl precursor comprises an alcohol. In some embodiments the carbonyl precursor comprises a polyhydroxyl compound. In some embodiments the aldehyde precursor comprises an alcohol. In some embodiments the aldehyde precursor comprises a polyhydroxyl compound. In some embodiments the polyhydroxyl compound comprises a diol, a triol or both. In some embodiments the polyhydroxyl compound comprises a diol. In some embodiments the diol is ethylene glycol. In some embodiments the polyhydroxyl compound comprises a sugar. In some embodiments the sugar is present in the lignin-based composition.

Generally, it is known that high heteroatom content is preferable for flame retardant compositions. This is due to the high tendency of carbon and hydrogen to oxidize in a flame as opposed to more oxidation resistant heteroatoms, such as nitrogen and oxygen. For this reason, formaldehyde, which has about 53% oxygen content, is routinely employed in compositions that are meant to withstand fire. Nevertheless, as formaldehyde is currently under growing regulation due to environmental and health hazards, it is an object to reduce its use. It was found that even though formaldehyde may be employed as a carbonyl source for the present FR material, the other components characteristics of the FR material enable the modification to other carbonyl from a more sustainable source, such as sugars and/or ethylene glycol.

The term "formaldehyde" includes the various isomers, oligomers and polymers of formaldehyde, such as gaseous formaldehyde, aqueous formaldehyde, paraformaldehyde and trioxane.

In some embodiments the FR material is substantially devoid of formaldehyde. In some embodiments the carbonyl source is substantially devoid of formaldehyde.

The phrase "substantially devoid" refers to not more than 5%, preferably, not more than 1% and more preferably, not more than 0.1% from the total amount, calculated as a mass fraction. For example, the phrase "the FR material is substantially devoid of formaldehyde" means that the weight of formaldehyde is not more than 5% of the total weight of the FR material. Similarly, the phrase "FR material is substantially devoid of water" means that the weight of water in the composition is not more than 5% of the total weight of the FR material.

Notwithstanding the aforesaid, it is important that the ratio between heteroatoms and C/H atoms is sufficiently high, in order to reduce the tendency of the resulting flame retardant to catch fire. This may be achieved by using amines and carbonyl sources, which have relatively high content of heteroatoms.

In some embodiments the FR material comprises not more than 45% carbon w/w. In some embodiments the FR material comprises not more than 40% carbon w/w. In some embodiments the FR material comprises not more than 35% carbon w/w. In some embodiments the FR material comprises not more than 30% carbon w/w. In some embodiments the FR material comprises not more than 25% carbon w/w. In some embodiments the FR material comprises not more than 20% carbon w/w. In some embodiments the FR material comprises 10% to 25% carbon w/w. In some embodiments the FR material comprises 13% to 22% carbon w/w. In some embodiments the FR material comprises 16% to 18% carbon w/w. In some embodiments the FR material comprises at least 40% nitrogen and oxygen w/w. In some embodiments the FR material comprises at least 45% nitrogen and oxygen w/w. In some embodiments the FR material comprises at least 50% nitrogen and oxygen w/w. In some embodiments the FR material comprises at least 55% nitrogen and oxygen w/w. In some embodiments the FR material comprises at least 60% nitrogen and oxygen w/w. In some embodiments the FR material comprises 45% to 65% nitrogen and oxygen w/w. In some embodiments the FR material comprises at least 5% nitrogen w/w. In some embodiments the FR material comprises at least 10% nitrogen w/w. In some embodiments the FR material comprises 5% to 15% nitrogen w/w. In some embodiments the FR material comprises 8% to 13% nitrogen w/w. In some embodiments the FR material comprises 11% to 12% nitrogen w/w. In some embodiments the FR material comprises at least 30% oxygen w/w. In some embodiments the FR material comprises at least 35% oxygen w/w. In some embodiments the FR material comprises at least 40% oxygen w/w. In some embodiments the FR material comprises 40% to 50% oxygen w/w. In some embodiments the FR material comprises 43% to 50% oxygen w/w. In some embodiments the FR material comprises 46% to 50% oxygen w/w. In some embodiments the FR material comprises 5% to 35% carbon, 2% to 25% nitrogen, 25% to 75% oxygen, 5% to 35% phosphorus and not more than 10% sulfur w/w. In some embodiments the FR material comprises 10% to 25% carbon, 5% to 15% nitrogen, 40% to 50% oxygen, 12 to 25% phosphorus and not more than 4% sulfur w/w. In some embodiments the FR material comprises 13% to 22% carbon, 8% to 13% nitrogen, 43% to 50% oxygen, 14% to 22% phosphorus and not more than 2% sulfur w/w. In some embodiments the FR material comprises 14% to 20% carbon, 10% to 13% nitrogen, 45% to 50% oxygen, 15% to 22% phosphorus and not more than 1% sulfur w/w. In some embodiments the FR material comprises 16% to 18% carbon, 11% to 12% nitrogen, 46% to 50% oxygen, 16 to 19% phosphorus and not more than 0.2% sulfur w/w. The weight percentages refer to fractions of the total weigh of a specific atom in the material divided by the total mass of the material.

In some embodiments the FR material comprises lignin in the range of 5-30% based on the total weight of the lignin-based composition, carbonyl source, amine and phosphorus oxide ingredients. In some embodiments the FR material comprises lignin in the range of 10-20% based on the total weight of the ingredients. In some embodiments the FR material comprises carbonyl(s) and/or carbonyl precursor(s) the range of 3-30% based on the total weight of the ingredients. In some embodiments the FR material comprises carbonyl(s) and/or carbonyl precursor(s) the range of 5-20% based on the total weight of the ingredients. In some embodiments the FR material comprises amine(s) in the range of 5-40% based on the total weight of the ingredients. In some embodiments the FR material comprises amine(s) in the range of 10-30% based on the total weight of the ingredients. In some embodiments the FR material comprises phosphorus oxide(s) in the range of 20-60% based on the total weight of the ingredients. In some embodiments the FR material comprises phosphorus oxide(s) in the range of 30-50% based on the total weight of the ingredients.

It is to be understood that the total mass of the product FR material produced may be lower than the total weight of the ingredients for its preparation, due to removal and/or evaporation of compounds, such as water and sulfur dioxide from the reaction mixture. It is further to be understood that since the lignin-based composition may include both lignin, sugars and water, its weight is typically greater than the weight of the lignins. Furthermore, the sugars, if exist in the lignin-based composition, are included as a part of the carbonyl source.

An additional improved feature of the current composition and process is that it removes most of the organic sulfur present in the SSL and BL lignin sources, which is a source of unpleasant odors. Specifically, the lignin sources initially contain about 2% to 4% sulfur. It was surprisingly found that this amount is reduced roughly by a factor of 10 or more during the process disclosed herein. Without wishing to be bound by any theory or mechanism, the removal of sulfur from the lignin sulfonate based composition is the result of its reaction with phosphorus pentoxide and/or with phosphoric acid. The reaction removes sulfur containing functional groups from the lignin skeleton, while the sulfur atoms are ejected as elemental sulfur and sulfur dioxide. Another positive effect removing the sulfur-containing groups from the lignin skeleton is that it results in a less soluble product—a desired feature of the present FR material. Specifically, sulfonate groups increase aqueous solubility of organic compounds, thus, their corresponding desulfurized products are typically less soluble in aqueous media.

In some embodiments the FR material comprises not more than 4% sulfur w/w. In some embodiments the FR material comprises not more than 3% sulfur w/w. In some embodiments the FR material comprises not more than 2% sulfur w/w. In some embodiments the FR material comprises not more than 1% sulfur w/w. In some embodiments the FR material comprises not more than 0.75% sulfur w/w. In some embodiments the FR material comprises not more than 0.5% sulfur w/w. In some embodiments the FR material comprises not more than 0.2% sulfur w/w.

Preferably, the FR material disclosed herein is solid at room temperature; it has poor water solubility, and is substantially devoid of water.

In some embodiments the FR material is substantially devoid of water. In some embodiments the FR material comprises not more than 5% water w/w. In some embodiments the FR material comprises not more than 2% water w/w. In some embodiments the FR material comprises not more than 1% water w/w. In some embodiments the FR material comprises not more than 0.5% water w/w. In some embodiments the FR material has an aqueous solubility of not more than 10 gr/L. In some embodiments the FR material has an aqueous solubility of not more than 5 gr/L. In some embodiments the FR material has an aqueous solubility of not more than 1 gr/L. In some embodiments the FR material has an aqueous solubility of not more than 0.5 gr/L.

Advantageously, as measured by thermogravimetric analysis (TGA) the FR composition disclosed herein is highly thermally stable. This property allows it to withstand the elevated temperatures required for plastics processing. Further, the composition is in the form of a fine powder, which allows its easy manipulation into flame retarded commercial products.

In some embodiments the FR material loses no more than 10% of its weight at 300° C., as measured by TGA under nitrogen. In some embodiments the FR material loses no more than 5% of is weight at 300° C., as measured by TGA under nitrogen. In some embodiments the FR material loses no more than 2% of its weight at 300° C., as measured by TGA under nitrogen.

In some embodiments the FR material is in the form of a powder. In some embodiments the FR material is in the form of a fine powder. In some embodiments FR material has particles having MMAD of not more than 20 micrometers. In some embodiments FR material has particles having MMAD of not more than 15 micrometers. In some embodiments FR material has particles having MMAD of not more than 10 micrometers. In some embodiments FR material has particles having MMAD of not more than 5 micrometers.

The term 'mass median aerodynamic diameter', also known as MMAD, as used herein is commonly considered as the median particle diameter by mass.

It was found that the present intumescent system can be formulated in a facile, convenient and cost-effective process. Specifically, the preparation of the FR material is performed by mixing of a lignin-based composition, a carbonyl source (s), an amine(s) and phosphorus oxide(s) in conditions appropriate to achieve the material, as described herein below.

In some embodiments there is provided a method for the preparation of a flame retardant material comprising the steps of (i) mixing a lignin-based composition, at least one carbonyl source selected from a carbonyl, a carbonyl precursor or both and at least one amine; (ii) adding at least one phosphorus oxide compound to the mixture of step (i); and (iii) drying the product obtained in step (ii) to obtain a solid, water-insoluble FR material.

In some embodiments, the phosphorus oxide compound is phosphorus pentoxide.

In some embodiments, step (i) comprises mixing the lignin-based composition, at least one carbonyl compound and at least one amine. In some embodiments, step (i) comprises mixing the lignin-based composition, at least one carbonyl precursor and at least one amine.

In some embodiments step (ii) further comprises maintaining the mixing of the mixture of step (i) together with the at least one phosphorus oxide. In some embodiments step (ii) further comprises externally heating the mixture. In some embodiments the heating is performed after the addition of the at least one phosphorus oxide. In some embodiments the addition of phosphorus oxide compound in step (ii) results in a chemical reaction. In some embodiments the reaction duration is in the range of 10 to 120 min. In some embodiments the reaction duration is in the range of 10 to 90 min. In some embodiments the reaction duration is in the range of 15 to 60 min. In some embodiments the reaction duration is in the range of 15 to 45 min.

In some embodiments step (ii) comprises adding the at least one phosphorus oxide compound in portions. In some embodiments step (ii) comprises adding the at least one phosphorus oxide compound in at least two portions. In some embodiments step (ii) comprises adding the at least one phosphorus oxide compound in at least three portions. In some embodiments the phosphorus oxide compound is phosphorous pentoxide, and step (ii) comprises adding said phosphorous pentoxide in at least two portions. In some embodiments and step (ii) comprises adding said phosphorous pentoxide in at least three portions. In some embodiments, the method does not include adding phosphoric acid. In some embodiments, step (ii) does not include adding phosphoric acid to the mixture of step (i).

As described above, the addition of phosphorous pentoxide to the mixture of the other components results in an exothermic reaction. Thus, it may be beneficial to add the phosphorous pentoxide to a mixture of the other components in portions, rather than mixing all the components, including phosphorous pentoxide together in one portion.

In some embodiments adding the phosphorous pentoxide in step (ii) results in an exothermic reaction. In some embodiments the exothermic reaction heats the mixture of step (ii) to above 100° C. In some embodiments the exothermic reaction heats the mixture of step (ii) to above 125° C. In some embodiments the exothermic reaction heats the mixture of step (ii) to above 140° C. In some embodiments the exothermic reaction heats the mixture of step (ii) to above 160° C. In some embodiments the exothermic reaction heats the mixture of step (ii) to a temperature in the range of 100° C. to 250° C. In some embodiments the exothermic reaction heats the mixture of step (ii) to a temperature in the range of 140° C. to 200° C.

In some embodiments adding the phosphorous oxide results in an exothermic reaction, and step (ii) is devoid of external heating. In some embodiments adding the phosphorous pentoxide results in an exothermic reaction, and step (ii) is devoid of external heating. In some embodiments step (ii) is devoid of external heating.

It is to be understood that an exothermic reaction results in the heating of the reaction mixtures and their vicinity. Therefore, it is to further be understood that the phrase "external heating" includes the heating of the reaction mixture, which does not result from the heat production of the reaction itself.

In some embodiments drying the product obtained in step (ii) is partially achieved by the exothermic reaction. Specifically, the exothermic reaction may cause evaporation of water from the reaction mixture. In some embodiments the mixture of step (i) comprises a first amount of water, and wherein the following the drying in step (iii), the FR material comprises less than 15% of said first amount. In some embodiments the FR material comprises less than 10% of said first amount. In some embodiments the FR material comprises less than 5% of said first amount. In some embodiments the FR material comprises less than 1% of said first amount. In some embodiments the mixture of step (i) comprises a first amount of water, and wherein the following the step (ii), the mixture comprises less than 50% of said first amount.

In some embodiments step (ii) further comprises externally heating the reaction to completion. In some embodiments the phosphorus oxide is phosphoric acid and step (ii) further comprises externally heating the reaction to completion.

In some embodiments step (iii) further comprises cooling the product obtained in step (ii). In some embodiments step (iii) further comprises allowing the product obtained in step (ii) to cool at room temperature.

It was found during the preparation of the flame retardant compositions disclosed herein that upon addition of the phosphorus oxide compound the mixture normally becomes acidic. Typically, the addition of the addition of the phosphorus oxide results in a mixture having a pH in the range of 2-7. However, adding an additional phosphorus oxide compound, such as hydroxyapatite typically elevates the pH, and upon addition of enough hydroxyapatite the solution may become neutral or even slightly basic.

In some embodiments the mixture formed after the addition of the at least one phosphorus oxide in step (ii) is acidic. In some embodiments the mixture formed after the addition of the at least one phosphorus oxide in step (ii) has a pH lower than 7. In some embodiments the mixture formed after the addition of the at least one phosphorus oxide in step (ii) has a pH in the range of 2 to 7. In some embodiments the mixture formed after the addition of the at least one phosphorus oxide in step (ii) has a pH in the range of 3 to 6.

Generally, the pH of the reaction mixture is preferably weakly acidic. Without wishing to be bound by any theory or mechanism, the relatively low pH stems from the acidity of the phosphorus oxide compound. In cases that pH modification is desired, it may be beneficial to add an additional phosphorus oxide compound as described above, such as hydroxyapatite, struvite and the like, as a buffer.

In some embodiments the method comprises step (iv) of grinding the FR material to a powder.

In some embodiments the FR material is prepared according to the methods disclosed herein. In some embodiments there is provided a flame retardant material prepared according to the method disclosed herein. In some embodiments there is provided a fire retardant material prepared according to the method disclosed herein.

The FR material of the invention can be incorporated into commonly used plastic materials as an additive in order to improve their FR properties without jeopardizing their mechanical properties. Such plastic materials may include, for example, epoxy boards, which often need to be protected from fire. The beneficial thermal stability obtained by the unique composition of the material of the invention, allows the use of both bioplastics and engineering plastics for the generation of improved plastic materials in terms of FR properties.

In some embodiments there is provided a plastic material comprising the FR material as described above. In some embodiments there is provided a plastic material comprising the FR material as described above and a polymeric material.

In some embodiments the polymeric material is of a synthetic origin. In some embodiments the polymeric material is selected from the group consisting of a thermoplastic polymer, a thermosetting polymer and an engineering plastic. In some embodiments the thermoplastic polymer is polyethylene or polypropylene. In some embodiments the thermoplastic polymer is styrenic in nature such as ABS (Acrylonitrile Butadiene Styrene) and HIPS (High Impact PolyStyrene). In some embodiments the thermoplastic polymer is polyester in nature such as PET (PolyEthylene Terephthalate) and PBT (PolyButylene Terephthalate). In some embodiments the thermosetting polymer is selected from the group consisting of polyurethane, epoxy resin and unsaturated polyester. In some embodiments the thermosetting polymer comprises an epoxy resin. In some embodiments the epoxy resin comprises a technical grade epoxy resin. In some embodiments the thermosetting polymer is an epoxy polymer. In some embodiments the engineering plastic is selected from the group consisting of polyethylene (PE), polypropylene (PP), polyamide (PA) and polybutylene terephthalate (PBT).

In some embodiments the polymeric material comprises an epoxy resin. In some embodiments the polymeric material is an epoxy polymer.

The term "thermoplastic polymer" denotes polymers containing compositions and materials that are generally capable of repeatedly softening when appropriately heated and hardening when subsequently cooled. Thermoplastic materials are generally in a solid or form stable state below the melting point or softening range, while generally being in a plastic or flowable state above the melting point or softening range. The term "thermoplastic material" as used herein further is understood to mean any thermoplastic polymer, including thermoplastic elastomers, and blends thereof.

As used herein, the term "thermosetting polymer" refers to a high polymer that solidifies or "sets" irreversibly when heated. This property is typically associated with a cross-linking reaction of the molecular constituents induced by heat, catalyst or irradiation. Phenolics, alkyds, amino resins, polyesters, urethanes, epoxides, and silicones are usually considered to be thermosets.

The term "engineering plastics" as used herein refers to a group of plastic materials that have better mechanical and/or thermal properties than the more widely used commodity plastics. "Engineering plastics" usually refers to thermoplastic polymers rather than thermosetting ones. Examples of engineering plastics include, but are not limited to, acrylonitrile-butadiene styrene (ABS), polycarbonates, polyesters and polyamides (nylons).

In some embodiments the plastic material comprises 1% to 50% w/w FR material based on the total weight of the plastic material. In some embodiments the weight of the FR material in the plastic material is in the range of 2% to 40% w/w based on the total weight of the plastic material. In some embodiments the weight of the FR material is in the range of 3% to 35% w/w based on the total weight of the plastic material. In some embodiments the weight of the FR material is in the range of 5% to 25% w/w based on the total weight of the plastic material. In some embodiments the weight of the FR material is in the range of 5% to 20% w/w based on the total weight of the plastic material. In some embodiments the weight of the FR material is in the range of 10% to 20% w/w based on the total weight of the plastic material.

In some embodiments there is provided a use of the FR material disclosed herein in the flame retarding of plastic materials. In some embodiments the plastic materials comprise polymeric materials. In some embodiments the plastic materials comprise epoxy resins, such as epoxy boards.

The following non-limiting examples are presented in order to more fully illustrate certain embodiments of the invention. They should in no way, however, be construed as limiting the broad scope of the invention. One skilled in the art can readily devise many variations and modifications of the principles disclosed herein without departing from the scope of the invention.

EXAMPLES

Flame Retardant Material Preparation

Example 1

One hundred (100) weight parts of spent sulfite liquor (SSL) were mixed with 30 weight parts of melamine, and 3 weight parts of paraformaldehyde. The resulting mixture was mixed for about 15 minutes in a dough mixer. Thereafter, 80 weight parts of phosphorus pentoxide $P_2O_5$ were added during 15-30 min in small portions. A very powerful exothermic reaction resulted in heating up to 200° C. of the reaction mixture. At this time, water evaporation was witnessed together with dehydration and chemical bonding of components, which happened simultaneously, generating a viscous, black paste.

When the exothermic process ceased and the temperature started to fall, the viscous paste formed was transferred to collection trays and allowed to cool slightly. The trays with the raw product were inserted into an oven and heated up to 250° C. for several hours. After cooling to room temperature the product was ground to a fine powder.

The decomposition temperature was measured using TGA under nitrogen. It was found that 5% weight loss occurs at 280° C.

An elemental analysis of the composition above provided the following results:

| C % | H % | O % | N % | P % | S % |
|---|---|---|---|---|---|
| 18.4 | 4.1 | 40-45 | 10.7 | 19.4 | 1.75 |

Example 2

The procedure of Example 1 was repeated, replacing the 3 weight parts of paraformaldehyde with 16.5 weight parts sucrose.

The decomposition temperature was measured using TGA. It was found that 5% weight loss occurs at 280° C.

An elemental analysis of the composition above provided the following results:

| C % | H % | O % | N % | P % | S % |
|---|---|---|---|---|---|
| 20.3 | 4 | 40-45 | 12 | 18 | 0.2 |

Example 3

The procedure of Example 1 was repeated, replacing the 3 weight parts of paraformaldehyde with 4-5 weight parts ethylene glycol.

The decomposition temperature was measured using TGA. It was found that 5% weight loss occurs at 277° C.

An elemental analysis of the composition above provided the following results:

| C % | H % | O % | N % | P % | S % |
|---|---|---|---|---|---|
| 14 | 3.8 | 40-45 | 10.2 | 18.2 | 0.2 |

Example 4

The procedure of Example 1 was repeated, further adding 30 weight parts gelatin (Empro, Belgium).

The decomposition temperature was measured using TGA. It was found that 5% weight loss occurs at 280° C.

An elemental analysis of the composition above provided the following results:

| C % | H % | O % | N % | P % | S % |
|---|---|---|---|---|---|
| 22.5 | 4.5 | 40-45 | 12.5 | 16 | 0.2 |

Example 5

The procedure of Example 1 was repeated, further adding 30 weight parts keratin (Empro, Belgium).

The decomposition temperature was measured using TGA. It was found that 5% weight loss occurs at 228° C.

An elemental analysis of the composition above provided the following results:

| C % | H % | O % | N % | P % | S % |
|---|---|---|---|---|---|
| 22.5 | 5.5 | 40-45 | 10.5 | 15 | 2.5 |

Example 6

The procedure of Example 1 was repeated, further adding 30 weight parts bovine gelatin (Gelita Do Brasil) and removing the 3 weight parts paraformaldehyde.

The decomposition temperature was measured using TGA. It was found that 5% weight loss occurs at 243° C.

Example 7

The procedure of Example 1 was repeated, further adding 30 weight parts keratin and removing the 3 weight parts paraformaldehyde.

Example 8

The procedure of Example 7 was repeated, further adding 20 weight parts keratin, such that 50 weight parts keratin were added overall.

The decomposition temperature was measured using TGA. It was found that 5% weight loss occurs at 228° C.

An elemental analysis of the composition above provided the following results:

| C % | H % | O % | N % | P % | S % |
|---|---|---|---|---|---|
| 21.7 | 5.5 | 40-45 | 9.5 | 14 | 2 |

Example 9

The procedure of Example 5 was repeated, replacing the 3 weight parts of paraformaldehyde with 50 weight parts propylene glycol.

Example 10

The procedure of Example 1 was repeated, replacing the 3 weight parts of paraformaldehyde with 25 weight parts ethylene glycol.

Example 11

The procedure of Example 1 was repeated, further adding 100 weight parts of a 50% keratin solution, removing the 3 weight parts paraformaldehyde, and modifying the amount of phosphorus pentoxide to 105 weight parts.

Example 12

The procedure of Example 1 was repeated, further adding 60 weight parts of a 50% keratin solution and 4 weight parts of ethylene glycol, removing the 3 weight parts paraformaldehyde, and modifying the amount of phosphorus pentoxide to 90 weight parts.

Example 13

The procedure of Example 1 was repeated, further adding 65 weight parts biomass slurry and removing the 3 weight parts paraformaldehyde. The biomass slurry contained proteins, Poly(3-hydroxybutyrate), DNA and RNA.

Example 14

The procedure of Example 1 was repeated, replacing the 80 weight parts of phosphorus pentoxide with 129 part of 85% phosphoric acid. Strong heating was required for 7 hours in order to complete the reaction.

Example 15

The procedure of Example 1 was repeated, further adding 60 weight parts apatite (calcium phosphate). It was possible to grind the product after only 15 minutes of reaction.

The decomposition temperature was measured using TGA. It was found that 1% weight loss occurs at 300° C.

An elemental analysis of the composition above provided the following results:

| C % | H % | O % | N % | P % | S % |
|---|---|---|---|---|---|
| 12.5 | 3.4 | 40-45 | 7.3 | 15.6 | 1.4 |

Example 16

The procedure of Example 1 was repeated, further adding 60 weight parts apatite (calcium phosphate) and 30 weight parts of fish meal and removing the 3 weight parts paraformaldehyde. It was possible to grind the product without further drying.

An elemental analysis of the composition above provided the following results:

| C % | H % | O % | N % | P % | S % |
|---|---|---|---|---|---|
| 14.5 | 3 | 40 | 8 | 17.8 | 0.7 |

Example 17

The procedure of Example 1 was repeated, further adding 60 weight parts apatite (calcium phosphate) and keratin and removing the 3 weight parts paraformaldehyde. It was possible to grind the product without further drying.

An elemental analysis of the composition above provided the following results:

| C % | H % | O % | N % | P % | S % |
|---|---|---|---|---|---|
| 16.8 | 3.5 | ND | 8.4 | 15 | 0.9 |

Example 18

The procedure of Example 1 was repeated with the following variations: (a) adding 35 weight parts hydroxyapatite; (b) adding 35 weight parts struvite; (c) replacing the 3 weight parts paraformaldehyde with 16 weight parts ethylene glycol; (d) reducing the amount of phosphorus pentoxide from 80 weight parts to 75 weight parts; and (e) adding another portion of 10 weight parts hydroxyapatite after the addition of phosphorus pentoxide. It was possible to grind the product without drying.

Example 19

The procedure of Example 1 was repeated, replacing the 100 weight parts of spent sulfite liquor (SSL) with 100 weight parts of Black Liquor (BL).

An elemental analysis was conducted on a dried portion of the BL as received providing the following results:

| C % | H % | O % | N % | P % | S % |
|---|---|---|---|---|---|
| 32.66 | 3.70 | ND | 0.01 | ND | 4.27 |

An elemental analysis of the composition produced as above provided the following results showing a dramatic decrease in the sulfur concentration:

| C % | H % | O % | N % | P % | S % |
|---|---|---|---|---|---|
| 12.39 | 3.45 | 45-50 | 10.95 | 22.03 | 0.77 |

Example 20

The procedure of Example 1 was repeated with the following variations: (a) replacing the 3 weight parts of paraformaldehyde with 10 weight parts ethylene glycol; (b) adding 10 weight parts calcium stearate; and (c) modifying the amount of phosphorus pentoxide from 80 weight parts to 85 weight parts, resulting in the formation of a low viscosity, black gel. After cooling the black mass was ground to a powder.

An elemental analysis of the composition produced as above provided the following results:

| C % | H % | O % | N % | P % | S % |
|---|---|---|---|---|---|
| 20.8 | 4.0 | ND | 9.7 | 16.5 | 1.6 |

Example 21

In a 1 L reactor, the following ingredients were mixed together for 30 minutes at room temperature: 100 g SSL, 30 g melamine, 3 g trioxane and 27.5 g of 80% phosphoric acid. Then, 50.7 g of phosphorous pentoxide was added in three portions. The temperature rose spontaneously to 105° C. An oil bath at 200° C. was then employed to maintain the temperature at 120-125° C. for 30 minutes. A mobile slurry was obtained and poured into a stainless steel tray (yield=183 g). After drying in a vacuum oven, 125 g of a black solid was obtained. The solid was ground into a black powder.

An elemental analysis of the product gave the following results:

| C % | H % | O % | N % | P % | S % |
|---|---|---|---|---|---|
| 15.4 | 4.2 | ND | 9.4 | 16.2 | 0.9 |

Example 22

Three hundred (300) weight parts of agricultural ammonium polyphosphate solution (34% $P_2O_5$ 10% N) were mixed with 200 weight parts of SSL, 100 weight parts of keratin, 150 weight parts of ammonia (25% water solution), 11 parts of $CuSO_4$ $5H_2O$ and 175 parts of piperazine. The resulting mixture was mixed for about 15 minutes in a dough mixer. Thereafter, 50 weight parts of phosphoric acid 85% and 100 parts of phosphorous pentoxide $P_2O_5$ were added during 15-30 min in small portions. A very powerful exothermic reaction resulted in heating of the reaction mixture up to 200° C. At this time, water evaporation was witnessed together with dehydration and chemical binding of components, which happened simultaneously, generating a viscous paste.

When the exothermic process ceased and the temperature started to fall, the viscous paste formed was transferred to collection trays and allowed to cool slightly. The trays with the raw product were inserted into an oven and heated up to 140° C. under a vacuum of 20 mbar for several hours. After cooling to room temperature the product was ground to a powder.

Example 23

Four hundred (400) weight parts of agricultural ammonium polyphosphate solution (34% $P_2O_5$ 10% N) were mixed with 200 weight parts of coffee waste (as lignin and sugars source) and 100 weight parts of melamine. The resulting mixture was mixed for about 15 minutes in a dough mixer. Thereafter, 100 weight parts of phosphoric acid 85% and 200 parts of phosphorous pentoxide $P_2O_5$ were added during 15-30 min in small portions. A very powerful exothermic reaction resulted in heating up to 200° C. of the reaction mixture. At this time, water evaporation was witnessed together with dehydration and chemical binding of components, which happened simultaneously, generating a viscous, black paste.

When the exothermic process ceased and the temperature started to fall, the viscous paste formed was transferred to collection trays and allowed to cool slightly. The trays with the raw product was inserted into an oven and heated up to 140° C. for several hours. After cooling to room temperature the product was ground to a powder.

An elemental analysis of the product gave the following results:

| C % | H % | O % | N % | P % | S % |
|---|---|---|---|---|---|
| 6.2 | 4.65 | ND | 12.36 | 9.72 | ND |

Example 24

Two hundred (200) weight parts of agricultural ammonium polyphosphate solution were mixed with 150 weight parts of SSL, 45 weight parts of melamine, 45 weight part of keratin, 100 weight part of ammonium hydroxide 25% solution and 90 weight parts of guanidine carbonate. The resulting mixture was mixed for about 15 minutes in a dough mixer. Thereafter, 50 weight parts of phosphoric acid 85% and 100 parts of phosphorous pentoxide $P_2O_5$ were added during 15-30 min in small portions. Finally, 55 weight parts of calcium phosphate, $Ca_3(PO_4)_2$ were added. A very powerful exothermic reaction resulted in heating the reaction mixture up to 200° C. At this time, water evaporation was witnessed together with dehydration and chemical binding of components, which happened simultaneously, generating a viscous, dark red paste.

When the exothermic process ceased and the temperature started to fall, the viscous paste formed was transferred to collection trays and allowed to cool slightly. The trays with the raw product were inserted into a vacuum oven and heated up to 140° C. for several hours under vacuum ~20 mbar. After cooling to room temperature the product was ground to a powder.

Example 25

DNA is rich in nitrogen and phosphorus and can therefore contribute to an FR formulation. A DNA extract extracted from waste innards of farm-raised salmon was supplied by Sintef Ltd (Norway). The nucleic acids were 40% of the dry weight of the extract measured by fluorescence assay. It was provided as a freeze-dried powder. 65 weight parts of agricultural ammonium polyphosphate solution were mixed with 50 weight parts of SSL, 15 weight parts of melamine and 15 weight parts of nucleic acid extract. The resulting mixture was mixed for about 15 minutes in a dough mixer. Thereafter, 17 weight parts of phosphoric acid 85% and 36 parts of phosphorous pentoxide $P_2O_5$ were added during 15-30 min in small portions. A very powerful exothermic reaction resulted in heating up to 200° C. of the reaction mixture. At this time, water evaporation was witnessed together with dehydration and chemical binding of components, which happened simultaneously, generating a viscous, dark paste.

When the exothermic process ceased and the temperature started to fall, the viscous paste formed was transferred to collection trays and allowed to cool slightly. The tray with the raw product was inserted into oven and heated up to 180° C. overnight. After cooling to room temperature the product was ground to a powder.

Example 26

Salmon fish meal (source of phosphorus and nitrogen) was received from Nutrimar (Norway). It was found to contain 5.2% phosphorus by weight (ICP measurement) and 9.65% nitrogen by elemental analysis.

One hundred (100) weight parts of spent sulfite liquor (SSL) were mixed with 30 weight parts of melamine, 3 weight parts of paraformaldehyde and 90 parts of salmon fish meal in two portions. The resulting mixture was mixed for about 15 minutes in a dough mixer. Thereafter, 53 weight parts of 80% phosphoric acid were added followed by 60 weight parts of phosphorus pentoxide during 30 min in small portions. A very powerful exothermic reaction resulted in the mixture heating up to 150° C. Simultaneously, water evaporation was witnessed together with dehydration and chemical bonding of components, generating a viscous, black paste.

When the exothermic process ceased and the temperature started to fall, the viscous paste formed was transferred to collection trays and allowed to cool slightly. The trays with the raw product were inserted into an oven and heated up to 250° C. for several hours. After cooling to room temperature the product was ground to a fine powder. The yield was 257 g.

The decomposition temperature was measured using TGA under nitrogen. It was found that 5% weight loss occurs at 190° C.

Elemental and ICP analyses of the product gave the following results:

| C % | H % | O % | N % | P % | S % | Ca |
|---|---|---|---|---|---|---|
| 12.3 | 4.2 | N.D. | 8.6 | 16.7 | 0.73 | 3.02 |

Burning Tests

Example 27: Preparation of Burning Samples

Burning samples were prepared as follows: varying concentrations (10-20% w/w) of ground flame retardant composition, prepared according to Example 15, were evenly dispersed within an epoxy mixture consisting of 2 weight parts of technical grade epoxy resin and weight 1 part of hardener. The resulting pastes were then poured into Teflon molds, designed to form 120 mm×12 mm×1.5 mm or 120 mm×12 mm×5 mm (Length×Width×Thickness) sticks. The mold was placed in an oven at 80° C. overnight to achieve complete curing of the epoxy, thus forming substantially homogeneous sticks.

Example 28: Burning Tests

Once fully cured the samples were taken for horizontal burning tests. Horizontal burning was conducted according to the UL-94 standard. The results for the thin (1.5 mm thickness) and thick (5 mm thickness) are shown in Table 1 and Table 2 respectively:

TABLE 1

Speed of flame spread in 120 mm × 12 mm × 1.5 mm sticks

| FR Concentration [% Wt] | Speed of flame spread [mm./min.] | Comments |
|---|---|---|
| 0 | 50 | Continuous dripping |
| 10 | 25 | No dripping |
| 12.5 | 23 | No dripping |
| 15 | N/A | Flame stopped burning 3 times |
| 20 | N/A | Flame stopped burning 3 times |

TABLE 2

Speed of flame spread in 120 mm × 12 mm × 5 mm sticks

| FR Concentration [% Wt] | Speed of flame spread [mm./min.] | Comments |
|---|---|---|
| 0 | 25 | Continuous dripping |
| 10 | N/A | Flame stopped burning 3 times |
| 15 | N/A | Flame stopped burning 3 times |
| 20 | N/A | Flame stopped burning 3 times |

In both 120 mm×12 mm×1.5 mm and 120 mm×12 mm×5 mm sticks the addition of the flame retardant composition resulted in strong flame retardation at concentrations as low as 10%-20%, which is evident by the decelerated speed of flame propagation by a factor of 2 or more while inhibiting dripping. In addition, the addition of the flame retardant composition completely prevented dripping of the sticks.

The foregoing description of the specific embodiments, will so fully reveal the general nature of the invention that others can, by applying current knowledge, readily modify and/or adapt for various applications such specific embodiments, without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

ACKNOWLEDGEMENTS

The work described in the above PCT application was supported by two Horizon 2020 grants from the European Commission DAFIA (Grant No 720770) and KARMA (Grant No. 723268)

The invention claimed is:

1. A flame retardant (FR) material comprising the reaction products formed by reacting
   a) a lignin-based composition, at least one carbonyl precursor, and at least one amine; and
   b) phosphorus pentoxide, wherein said material is solid at 25° C.;
   wherein the carbonyl precursor comprises a sugar,
   wherein the FR material comprises not more than 3% sulfur w/w.

2. The FR material according to claim 1, wherein said material is a chemical reaction product of
   a) 12-50% of a lignin-based composition, 1-20% of at least one carbonyl precursor or both, and 10-35% of at least one amine; and
   b) 25-55% of phosphorus pentoxide.

3. The FR material according to claim 1, wherein the lignin-based composition is selected from Spent Sulfite Liquor (SSL), Black Liquor (BL), coffee waste, olive pomace, straw, grass, tea leaves, nut shells, dietary fiber, fruit pits and a combination thereof.

4. The FR material according to claim 1, wherein the lignin-based composition is selected from Spent Sulfite Liquor (SSL), Black Liquor (BL) and a combination thereof.

5. The FR material according to claim 1, wherein the amine is selected from melamine, piperazine, guanidine carbonate, ethylene diamine, an amino acid, a polypeptide, a nucleic acid and combinations thereof.

6. The FR material according to claim 1, wherein the sugar is present in said lignin-based composition.

7. The FR material according to claim 1, comprising 10 to 25% carbon, 5 to 20% nitrogen, 40 to 50% oxygen, 12 to 30% phosphorus and not more than 3% sulfur w/w.

8. The FR material according to claim 1, comprising not more than 2% water w/w.

9. The FR material according to claim 1, wherein the reaction mixture for the production of said reaction products comprises not more than 5% formaldehyde.

10. The FR material according to claim 1, further comprising an additional phosphorus compound, selected from hydroxyapatite, struvite, phosphorite and a combination thereof.

11. A plastic material comprising the FR material according to claim 1 and a polymeric material.

12. The plastic material according to claim 11, wherein the polymeric material is selected from the group consisting of polyhydroxyalkanoate (PHA), polyethylene glycol (PEG), polyester, polyamide, polylactic acid (PLA), polybutylene succinate (PBS), poly p-phenylene (PPP), polytrimethylene tetraphthalate (PTT), polyethylene (PE), polypropylene (PP), polystyrene (PS), polycarbonate (PC) polyacrylonitrile butadiene styrene (ABS) and combinations thereof.

13. A method for the preparation of the FR material of claim 1, the method comprising the steps of:
   mixing the lignin-based composition, the carbonyl precursor and the amine;
   (ii) adding the phosphorus pentoxide to the mixture of step (i); and
   (iii) drying the product obtained in step (ii) to obtain a solid, water-insoluble FR material.

14. The method according to claim 13, wherein step (ii) comprises adding said phosphorous pentoxide in at least two portions.

15. The method according to claim 13, wherein adding said phosphorous pentoxide results in an exothermic reaction, and wherein step (ii) is devoid of external heating.

16. The method according to claim 15, wherein said exothermic reaction results in heating the mixture of step (ii) to a temperature in the range of 100° C. to 200° C.

17. The method according to claim 16, wherein the exothermic reaction releases sulfur containing gases that are scrubbed.

18. The method according to claim 13, further comprising step (iv) of grinding the FR material to a powder.

19. The method according to claim 13, wherein the mixture of step (i) comprises a first amount of water, and wherein the following the drying in step (iii), the material comprises less than 15% of said first amount.

20. The method according to claim 13, wherein step (iii) further comprises cooling the product obtained in step (ii).

* * * * *